(12) United States Patent
Fan et al.

(10) Patent No.: US 10,303,229 B2
(45) Date of Patent: May 28, 2019

(54) WATER-COOLING HEAT DISSIPATION MODULE

(71) Applicant: AURAS Technology Co., Ltd., New Taipei (TW)

(72) Inventors: Mu-Shu Fan, New Taipei (TW); Chien-Yu Chen, New Taipei (TW)

(73) Assignee: AURAS TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/904,482

(22) Filed: Feb. 26, 2018

(65) Prior Publication Data

US 2018/0253126 A1 Sep. 6, 2018

Related U.S. Application Data

(60) Provisional application No. 62/465,354, filed on Mar. 1, 2017.

(30) Foreign Application Priority Data

Mar. 24, 2017 (TW) .............................. 106204182 U

(51) Int. Cl.
*F28D 1/06* (2006.01)
*G06F 1/20* (2006.01)

(52) U.S. Cl.
CPC ................ *G06F 1/206* (2013.01); *G06F 1/20* (2013.01); *G06F 2200/201* (2013.01)

(58) Field of Classification Search
CPC ....... G06F 1/206; G06F 2200/201; F28C 3/04
USPC ............................................ 165/80.4, 104.19
See application file for complete search history.

(56) References Cited

U.S. PATENT DOCUMENTS

| | | | | |
|---|---|---|---|---|
| 5,203,407 | A * | 4/1993 | Nagasaka | F28D 1/05375 165/174 |
| 5,363,910 | A * | 11/1994 | Baba | F28D 1/05366 165/153 |
| 6,604,574 | B1 * | 8/2003 | Loomis | F28F 9/0224 165/173 |
| 2011/0005243 | A1 * | 1/2011 | MacRi | F25B 39/00 62/77 |
| 2011/0284186 | A1 * | 11/2011 | Hirai | F28D 1/0461 165/104.19 |
| 2012/0241139 | A1 * | 9/2012 | Katoh | F28D 1/0426 165/202 |
| 2013/0199460 | A1 * | 8/2013 | Duplessis | B21D 53/02 122/13.01 |
| 2014/0102672 | A1 * | 4/2014 | Campbell | H05K 7/20836 165/104.33 |

(Continued)

*Primary Examiner* — Claire E Rojohn, III
(74) *Attorney, Agent, or Firm* — WPAT, PC

(57) ABSTRACT

A water-cooling heat dissipation module includes a hot-water heat exchange structure, a cold-water heat exchange structure, a fluid communication structure and a fan. The fluid communication structure is in communication with the hot-water heat exchange structure and the cold-water heat exchange structure. The fan and the hot-water heat exchange structure are opposed to each other with respect to the cold-water heat exchange structure. An airflow produced by the fan blows the cold-water heat exchange structure and the hot-water heat exchange structure sequentially. Consequently, the cold-water heat exchange structure will not receive the heat from the hot-water heat exchange structure through the airflow.

6 Claims, 3 Drawing Sheets

(56) References Cited

U.S. PATENT DOCUMENTS

2014/0124161 A1* 5/2014 Han ................... B60H 1/00335
                                                        165/42
2018/0196482 A1* 7/2018 Wu ........................... G06F 1/20
2018/0253126 A1* 9/2018 Fan ........................... G06F 1/20
2018/0255662 A1* 9/2018 Fan ....................... F04D 17/025

* cited by examiner

WATER-COOLING HEAT DISSIPATION MODULE

CROSS-REFERENCE TO RELATED APPLICATION

This application claims priority to U.S. Provisional Patent Application No. 62/465,354 filed Mar. 1, 2017, the contents of which are incorporated herein by reference.

FIELD OF THE INVENTION

The present invention relates to a heat dissipation module, and more particularly to a water-cooling heat dissipation module.

BACKGROUND OF THE INVENTION

With increasing development of science and technology, the operating speed of a central processing unit is gradually increased. However, during the operation of the central processing unit, a great amount of waste heat is generated. The generation of the waste heat is a serious problem. Generally, the conventional heat dissipation module has some drawbacks. For example, the distance between a cold-water pipe and a hot-water pipe is very short. Moreover, due to the thermal conduction, the cold-water pipe may absorb the heat from the hot-water pipe. Under this circumstance, the heat dissipating efficiency is impaired. Moreover, the conventional heat dissipation module is only designed to dissipate the heat of the conventional heat dissipation module to the surroundings. That is, the relative locations between the fan, the hot-water pipe and the cold-water pipe are not taken into consideration. Since the heated airflow around the hot-water pipe usually blows toward the cold-water pipe, the temperature of the cold-water pipe is further increased. In other words, the heat dissipating efficiency of the overall heat dissipation module is reduced.

SUMMARY OF THE INVENTION

The present invention relates to a heat dissipation module, and more particularly to a water-cooling heat dissipation module.

An object of the present invention provides a water-cooling heat dissipation module. An airflow produced by a fan of the water-cooling heat dissipation module blows the cold-water pipes and the hot-water pipes sequentially. Consequently, the heat dissipating efficiency of the overall water-cooling heat dissipation module is enhanced.

In accordance with an aspect of the present invention, there is provided a water-cooling heat dissipation module. The water-cooling heat dissipation module includes a hot-water heat exchange structure, a cold-water heat exchange structure, a fluid communication structure and a fan. The hot-water heat exchange structure includes a hot-water container and plural hot-water pipes. The plural hot-water pipes are in communication with the hot-water container. The cold-water heat exchange structure includes a cold-water container and plural cold-water pipes. The plural cold-water pipes are in communication with the cold-water container. The fluid communication structure is in communication with the plural cold-water pipes and the plural hot-water pipes. The fan and the hot-water heat exchange structure are located beside two opposite sides of the cold-water heat exchange structure. An airflow produced by the fan blows the cold-water heat exchange structure and the hot-water heat exchange structure sequentially.

In an embodiment, the hot-water container and the cold-water container are located at a first side of the water-cooling heat dissipation module, the fluid communication structure is located at a second side of the water-cooling heat dissipation module, and the first side and the second side of the water-cooling heat dissipation module are opposed to each other. The plural hot-water pipes are horizontally connected between the hot-water container and the fluid communication structure. The plural cold-water pipes are horizontally connected between the cold-water container and the fluid communication structure.

In an embodiment, the plural hot-water pipes and the plural cold-water pipes are flat pipes, and the plural hot-water pipes and the plural cold-water pipes are in parallel with each other and in array arrangements.

In an embodiment, the hot-water container includes a hot-water inlet channel, the cold-water container includes a cold-water outlet channel, and the hot-water inlet channel is in parallel with the cold-water outlet channel. An arranging direction of the hot-water inlet channel is perpendicular to an arranging direction of the plural hot-water pipes. An arranging direction of the cold-water outlet channel is perpendicular to an arranging direction of the plural cold-water pipes.

In an embodiment, the hot-water container further includes a concave structure. The cold-water outlet channel of the cold-water container is accommodated within the concave structure. Moreover, the cold-water outlet channel and the hot-water inlet channel are arranged side by side.

In an embodiment, the water-cooling heat dissipation module further includes plural fins. The plural fins are horizontally arranged between the hot-water container and the fluid communication structure and between the cold-water container and the fluid communication structure.

In an embodiment, the hot-water pipes and the cold-water pipes are sandwiched between the plural fins along a vertical direction.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
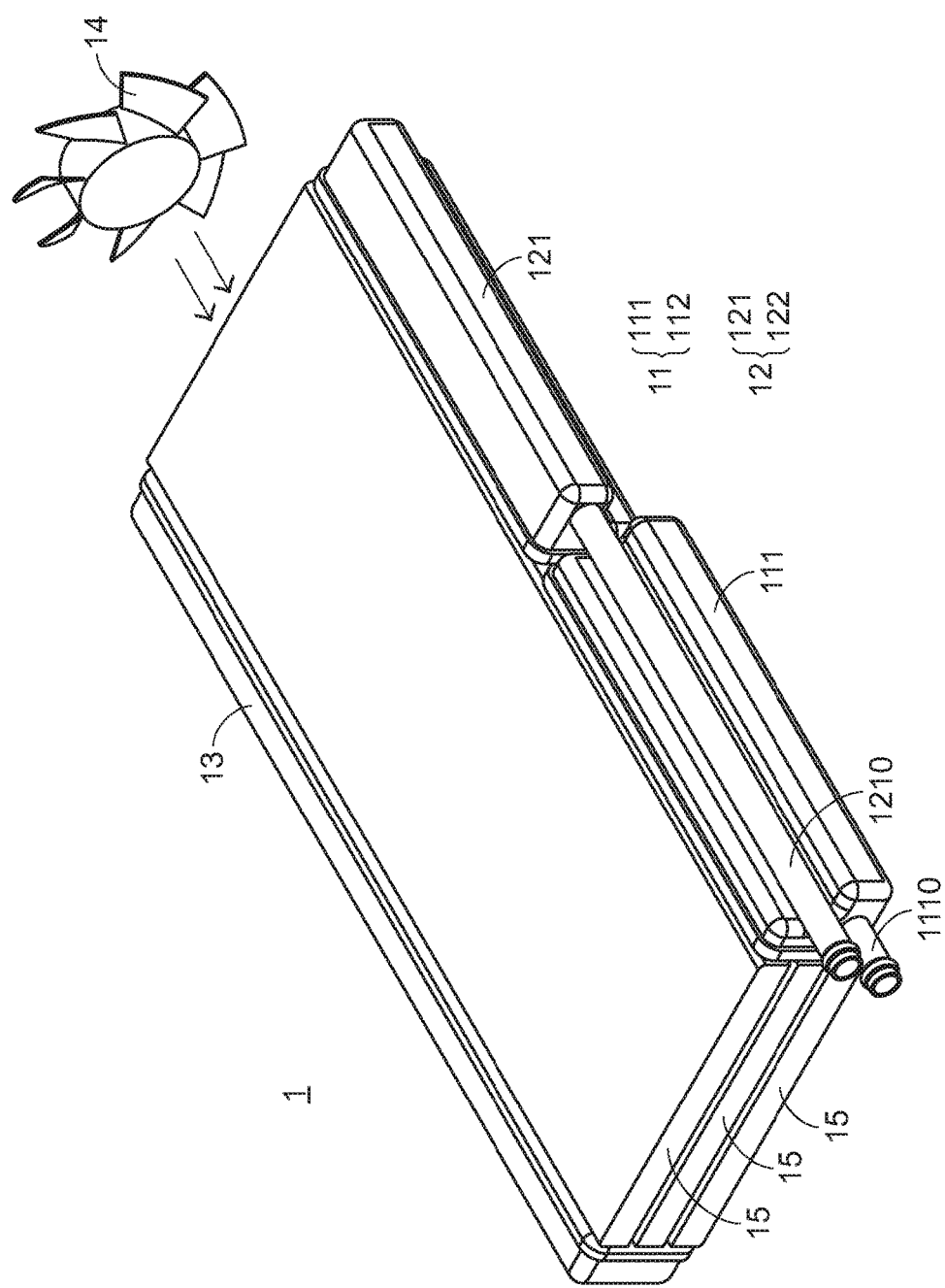
FIG. 1 is a schematic perspective view illustrating a water-cooling heat dissipation module according to an embodiment of the present invention.
Figure 2:
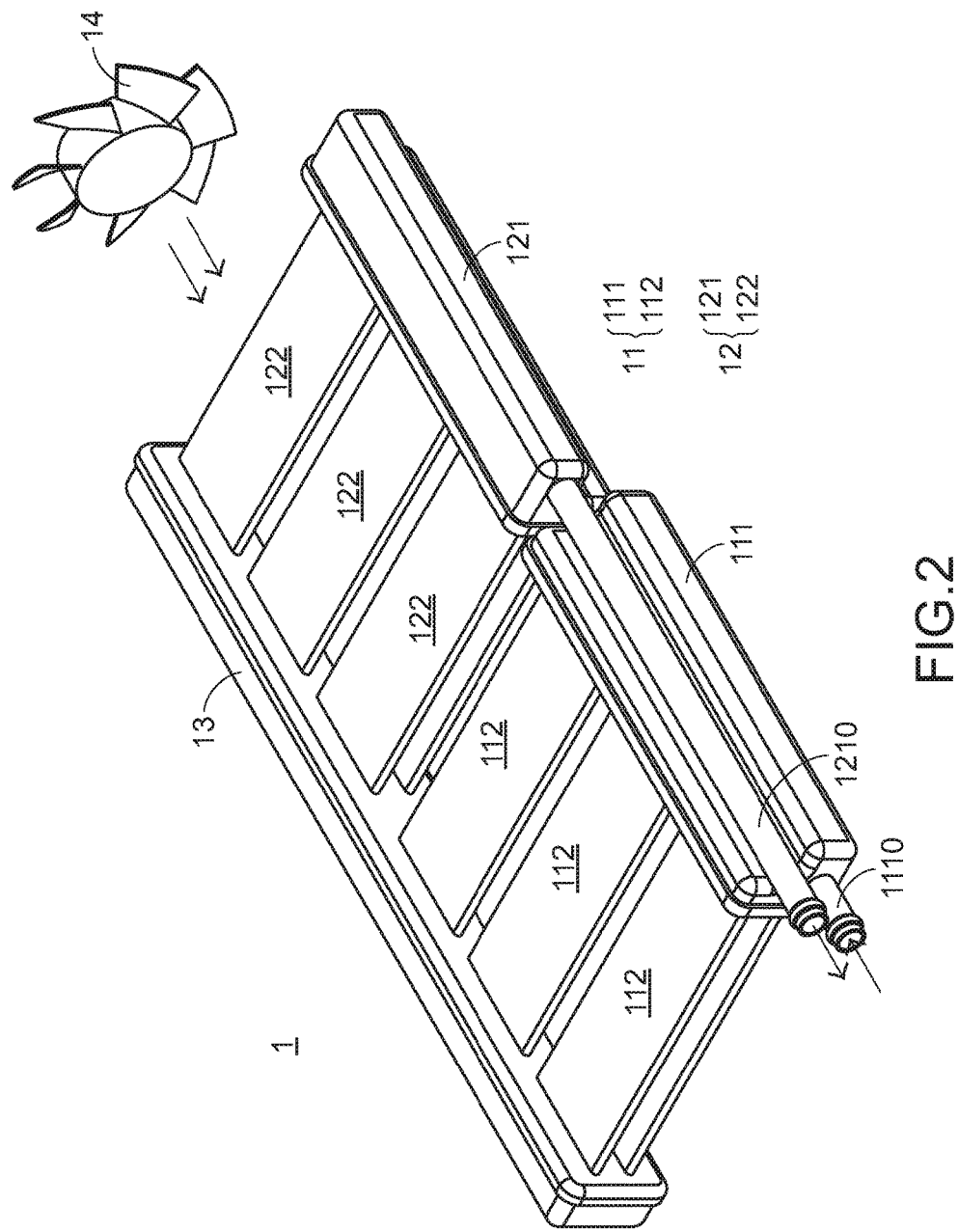
FIG. 2 is a schematic perspective view illustrating the water-cooling heat dissipation module according to the embodiment of the present invention, in which the fins are not shown.

Please refer to FIGS. 1 and 2. FIG. 1 is a schematic perspective view illustrating a water-cooling heat dissipation module according to an embodiment of the present invention. FIG. 2 is a schematic perspective view illustrating the water-cooling heat dissipation module according to the embodiment of the present invention, in which the fins are not shown. In this embodiment, the water-cooling heat dissipation module 1 comprises a hot-water heat exchange structure 11, a cold-water heat exchange structure 12, a fluid communication structure 13 and a fan 14. The hot-water heat exchange structure 11 comprises a hot-water container 111 and plural hot-water pipes 112. The hot-water container 111 is in fluid communication with the plural hot-water pipes 112. The cold-water heat exchange structure 12 comprises a cold-water container 121 and plural cold-water pipes 122. The cold-water container 121 is in fluid communication with the plural cold-water pipes 122.

Figure 3:
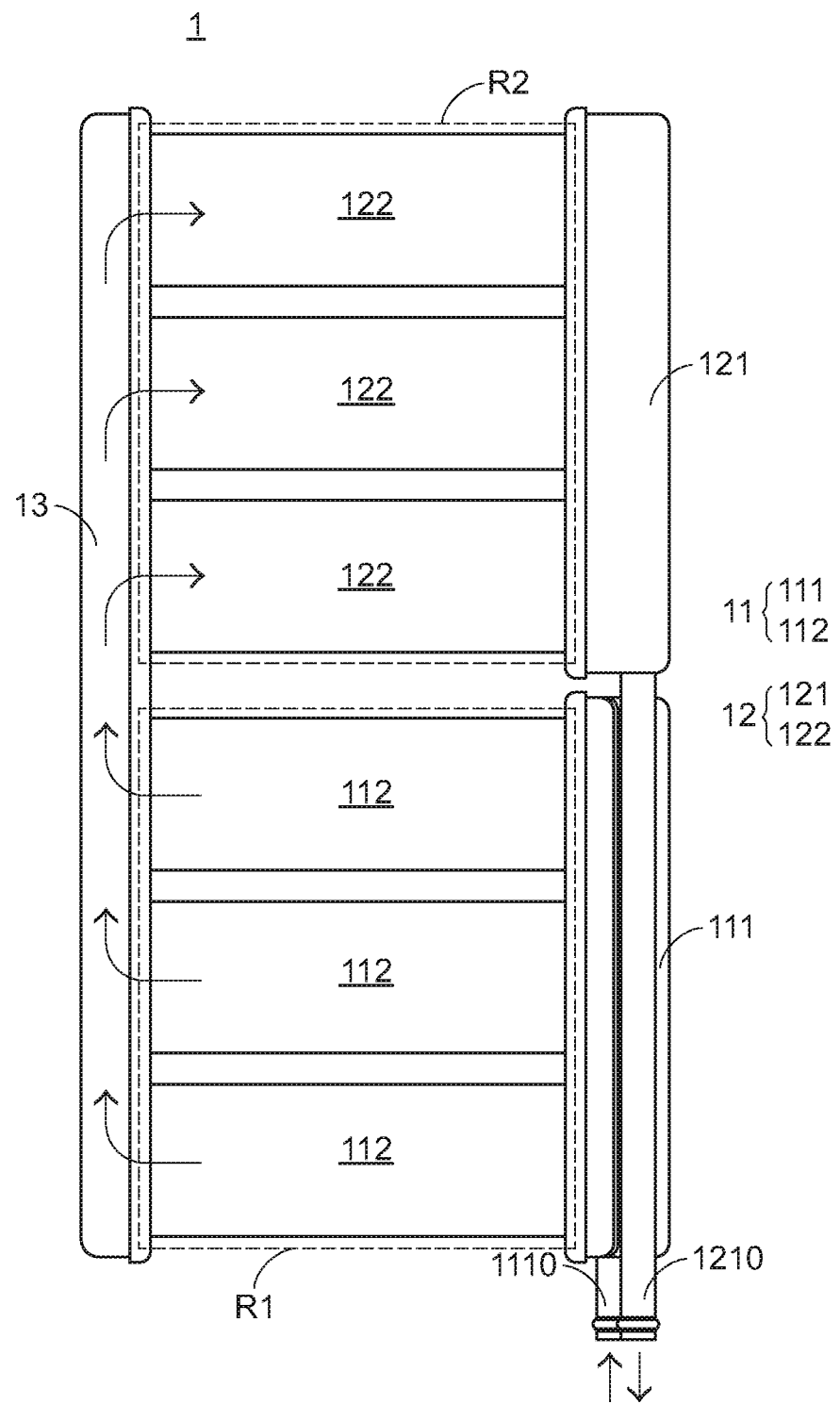
FIG. 3 is a schematic top view illustrating the water-cooling heat dissipation module according to the embodiment of the present invention, in which the fins are not shown.

FIG. 3 is a schematic top view illustrating the water-cooling heat dissipation module according to the embodiment of the present invention, in which the fins are not shown. Please refer to FIGS. 2 and 3. The hot-water container 111 comprises a hot-water inlet channel 1110. The cold-water container 121 comprises a cold-water outlet channel 1210. After the waste heat from an electronic component (not shown) is absorbed, the heated water with a higher temperature is introduced into the hot-water container 111 through the hot-water inlet channel 1110. Then, the water is transferred through to the cold-water container 121 through the plural hot-water pipes 112, the fluid communication structure 13 and the plural cold-water pipes 122 sequentially. Then, the cooled water with a lower temperature is outputted from the cold-water outlet channel 1210. Then, the cooled water is pressured by a pump (not shown), and thus the water is circulated. The principles of pressuring and circulating the water are not the subject of the present invention, and are not redundantly described herein.

The structures of the components of the water-cooling heat dissipation module will be illustrated in more details as follows. First of all, the water-cooling heat dissipation module 1 has the flat rectangular profile. The hot-water container 111 and the cold-water container 121 are located at a first long side of the rectangular profile. Moreover, the length of the hot-water container 111 is equal to a half of the length of the first long side, and the length of the cold-water container 121 is equal to the other half of the length of the first long side. The fluid communication structure 13 is located at a second long side of the rectangular profile. The second long side is opposed to the first long side. Moreover, the length of the fluid communication structure 13 is equal to the length of the second long side. The plural hot-water pipes 112 are horizontally connected between the hot-water container 111 and the fluid communication structure 13. That is, the hot-water container 111 and the fluid communication structure 13 are in fluid communication with each other through the plural hot-water pipes 112. The plural hot-water pipes 112 are discretely arranged at regular spacing intervals and in parallel with each other. The plural cold-water pipes 122 are horizontally connected between the cold-water container 121 and the fluid communication structure 13. That is, the cold-water container 121 and the fluid communication structure 13 are in fluid communication with each other through the plural cold-water pipes 122. The plural cold-water pipes 122 are discretely arranged at regular spacing intervals and in parallel with each other. Moreover, the cold-water pipes 122 are aligned with the hot-water pipes 112.

In an embodiment, the plural hot-water pipes 112 and the plural cold-water pipes 122 are flat pipes. Preferably, the plural hot-water pipes 112 and the plural cold-water pipes 122 are in array arrangements. The plural hot-water pipes 112 are included in a first zone R1. The plural cold-water pipes 122 are included in a second zone R2. The first zone R1 and the second zone R2 are arranged beside each other. That is, the plural hot-water pipes 112 are not overlapped with the plural cold-water pipes 122. In this embodiment, the plural hot-water pipes 112 are included in the front zone, and the plural cold-water pipes 122 are included in the rear zone.

Moreover, the fan 14 is located near a side the cold-water pipes 122. Consequently, an airflow produced by the fan blows the cold-water heat exchange structure 12 (e.g., the cold-water pipes 122) and the hot-water heat exchange structure 11 (e.g., the hot-water pipes 112) sequentially. This arrangement is beneficial. After the airflow blows through the cold-water heat exchange structure 12, the temperature of the airflow is not higher than the temperature of the hot-water heat exchange structure 11. Consequently, after the airflow blows the hot-water heat exchange structure 11, the temperature of the hot-water heat exchange structure 11 will be further decreased. After the airflow blows the hot-water heat exchange structure 11, the heated airflow is not directed to the cold-water heat exchange structure 12. In other words, the cold-water heat exchange structure 12 will not absorb the unnecessary heat.

For saving the layout space and increasing the utilization convenience, the water-cooling heat dissipation module 1 is modified. For example, the arranging direction of the hot-water inlet channel 1110 is perpendicular to the arranging direction of the hot-water pipes 112, and the arranging direction of the cold-water outlet channel 1210 is perpendicular to the arranging direction of the cold-water pipes 122.

Moreover, the hot-water container 111 further comprises a concave structure. The cold-water outlet channel 1210 of the cold-water container 121 is accommodated within the concave structure. Moreover, the cold-water outlet channel 1210 and the hot-water inlet channel 1110 are arranged side by side. Consequently, the cold-water outlet channel 1210 can be easily connected to the pump through an external pipe.

The water-cooling heat dissipation module 1 further comprises plural fins 15. The plural fins 15 are horizontally arranged between the hot-water container 111 and the fluid communication structure 13 and between the cold-water container 121 and the fluid communication structure 13. Moreover, the hot-water pipes 112 and the cold-water pipes 122 are sandwiched between two adjacent fins 15 along the vertical direction. Consequently, the fins 15 can receive the heat from the hot-water pipes 112 and the cold-water pipes 122 more easily. Consequently, the heat dissipating efficiency is enhanced.

From the above descriptions, the relative locations of the fan, the hot-water heat exchange structure and the cold-water heat exchange structure are specially designed. That is, the hot-water heat exchange structure and the cold-water heat exchange structure are arranged sequentially. Since the airflow produced by the fan blows the cold-water heat exchange structure and the hot-water heat exchange structure sequentially, the heat dissipating efficiency of the overall water-cooling heat dissipation module is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A water-cooling heat dissipation module, comprising:
a hot-water heat exchange structure comprising a hot-water container and plural hot-water pipes, wherein the plural hot-water pipes are in communication with the hot-water container;
a cold-water heat exchange structure comprising a cold-water container and plural cold-water pipes, wherein the plural cold-water pipes are in communication with the cold-water container;
a fluid communication structure in direct communication with the plural cold-water pipes and the plural hot-water pipes; and
a fan, wherein fan and the hot-water heat exchange structure are located beside two opposite sides of the cold-water heat exchange structure, and an airflow produced by the fan blows the cold-water heat exchange structure and the hot-water heat exchange structure sequentially;
wherein the hot-water container further comprises a concave structure and a hot-water inlet channel, the cold-water container comprises a cold-water outlet channel, wherein the cold-water outlet channel of the cold-water container is accommodated within the concave structure, and the cold-water outlet channel and the hot-water inlet channel are arranged side by side.

2. The water-cooling heat dissipation module according to claim 1, wherein the hot-water container and the cold-water container are located at a first side of the water-cooling heat dissipation module, the fluid communication structure is located at a second side of the water-cooling heat dissipation module, and the first side and the second side of the water-cooling heat dissipation module are opposed to each other, wherein the plural hot-water pipes are horizontally connected between the hot-water container and the fluid communication structure, and the plural cold-water pipes are horizontally connected between the cold-water container and the fluid communication structure.

3. The water-cooling heat dissipation module according to claim 2, wherein the plural hot-water pipes and the plural cold-water pipes are flat pipes, and the plural hot-water pipes and the plural cold-water pipes are in parallel with each other and in array arrangements.

4. The water-cooling heat dissipation module according to claim 3, wherein the hot-water inlet channel is in parallel with the cold-water outlet channel, wherein an arranging direction of the hot-water inlet channel is perpendicular to an arranging direction of the plural hot-water pipes, and an arranging direction of the cold-water outlet channel is perpendicular to an arranging direction of the plural cold-water pipes.

5. The water-cooling heat dissipation module according to claim 1, wherein the water-cooling heat dissipation module further comprises plural fins, wherein the plural fins are horizontally arranged between the hot-water container and the fluid communication structure and between the cold-water container and the fluid communication structure.

6. The water-cooling heat dissipation module according to claim 5, wherein the hot-water pipes and the cold-water pipes are sandwiched between the plural fins along a vertical direction.

* * * * *